US012812643B2

(12) United States Patent
Kim et al.

(10) Patent No.: US 12,812,643 B2
(45) Date of Patent: Nov. 24, 2026

(54) METHOD AND DEVICE FOR PERFORMING UPLINK OR DOWNLINK TRANSMISSION AND RECEPTION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 18/697,718

(22) PCT Filed: Sep. 27, 2022

(86) PCT No.: PCT/KR2022/014430
§ 371 (c)(1),
(2) Date: Apr. 1, 2024

(87) PCT Pub. No.: WO2023/055024
PCT Pub. Date: Apr. 6, 2023

(65) Prior Publication Data
US 2024/0406957 A1 Dec. 5, 2024

(30) Foreign Application Priority Data
Oct. 1, 2021 (KR) ........................ 10-2021-0131008

(51) Int. Cl.
*H04W 72/1273* (2023.01)
*H04W 56/00* (2009.01)
(Continued)

(52) U.S. Cl.
CPC ... *H04W 72/1273* (2013.01); *H04W 56/0015* (2013.01); *H04W 72/1268* (2013.01); *H04W 76/20* (2018.02)

(58) Field of Classification Search
CPC . H04W 72/1273; H04W 76/20; H04W 80/02; H04W 56/0015; H04W 72/1268;
(Continued)

(56) References Cited

U.S. PATENT DOCUMENTS

2022/0103232 A1* 3/2022 Zhou ..................... H04W 76/19
2023/0156845 A1* 5/2023 Khoshnevisan ........ H04L 5/001
370/216

(Continued)

FOREIGN PATENT DOCUMENTS

EP 3863211 8/2021
WO 2021162334 8/2021

OTHER PUBLICATIONS

European Patent Office Application Serial No. 22876796.8, Search Report dated Sep. 15, 2025, 10 pages.

(Continued)

*Primary Examiner* — Brian D Nguyen
(74) *Attorney, Agent, or Firm* — LEE, HONG, DEGERMAN, KANG & WAIMEY

(57) ABSTRACT

Disclosed are a method and device for performing uplink or downlink transmission and reception in a wireless communication system. The method for performing uplink or downlink transmission and reception according to an embodiment disclosed herein comprises the steps in which a terminal: receives, from a base station, configuration information related to a plurality of CORESET pool candidates; receives, from the base station, first information for activating a first CORESET pool and a second CORESET pool among the plurality of CORESET pool candidates; and
(Continued)

performs the uplink transmission or the downlink reception on the basis of at least one CORESET included in each of the first CORESET pool and the second CORESET pool, wherein the first CORESET pool may be related to a serving cell, and the second CORESET pool may be related to one of the serving cell or a non-serving cell.

7 Claims, 9 Drawing Sheets

(51) Int. Cl.
*H04W 72/1268* (2023.01)
*H04W 76/20* (2018.01)

(58) Field of Classification Search
CPC ... H04L 5/0094; H04L 5/0053; H04L 5/0091; H04L 5/0023; H04L 5/0035
See application file for complete search history.

(56) References Cited

U.S. PATENT DOCUMENTS

2024/0138014 A1* 4/2024 Jung .................. H04B 7/06964
2024/0243866 A1* 7/2024 Matsumura ........... H04W 72/04

OTHER PUBLICATIONS

PCT International Application No. PCT/KR2022/014430, International Search Report dated Jan. 13, 2023, 2 pages.
CATT, "Enhancements on multi-TRP/panel transmission for PDCCH, PUCCH and PUSCH," 3GPP TSG RAN WG1 #106-e, R1-2106936, Aug. 2021, 21 pages.
Futurewei, "Inter-cell multi-TRP operation," 3GPP TSG RAN WG1 Meeting #106-e, R1-2107080, Aug. 2021, 8 pages.
MediaTek Inc., "Enhancement on multi-beam operation," 3GPP TSG RAN WG1 #106-e, R1-2107485, Aug. 2021, 37 pages.
InterDigital Inc., "Further Discussion on M-TRP Inter-cell Operation," 3GPP TSG RAN WG1 Meeting #106-e, R1-2106642, Aug. 2021, 5 pages.

* cited by examiner

METHOD AND DEVICE FOR PERFORMING UPLINK OR DOWNLINK TRANSMISSION AND RECEPTION IN WIRELESS COMMUNICATION SYSTEM

CROSS-REFERENCE TO RELATED APPLICATION(S)

This application is the National Stage filing under 35 U.S.C. 371 of International Application No. PCT/KR2022/014430, filed on Sep. 27, 2022, which claims the benefit of earlier filing date and right of priority to Korean Application No. 10-2021-0131008, filed on Oct. 1, 2021, the contents of which are all incorporated by reference herein in their entirety.

TECHNICAL FIELD

The present disclosure relates to a wireless communication system, and more specifically, to a method and device for performing uplink transmission and reception or downlink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing uplink transmission and reception or downlink transmission and reception in a wireless communication system.

In addition, an additional technical problem of the present disclosure is to provide a method and device for dynamically switching inter-cell (or between cells) M-TRP operation or intra-cell (within a cell) M-TRP operation.

The technical objects to be achieved by the present disclosure are not limited to the above-described technical objects, and other technical objects which are not described herein will be clearly understood by those skilled in the pertinent art from the following description.

According to one embodiment of the present disclosure, a method of performing uplink transmission or downlink reception by a user equipment (UE) in a wireless communication system may include receiving, from a base station, configuration information related to a plurality of control resource sets (CORESET) pool candidates; receiving, from the base station, first information activating a first CORESET pool and a second CORESET pool among the plurality of CORESET pool candidates; and performing the uplink transmission or the downlink reception based on at least one CORESET included in each of the first CORESET pool and the second CORESET pool, and the first CORESET pool may be associated with a serving cell, and the second CORESET pool may be associated with one of the serving cell or non-serving cell.

According to another embodiment of the present disclosure, A method of performing uplink reception or downlink transmission by a base station in a wireless communication system may include transmitting, to a user equipment (UE), configuration information related to a plurality of control resource sets (CORESET) pool candidates; transmitting, to the UE, first information activating a first CORESET pool and a second CORESET pool among the plurality of CORESET pool candidates; and performing the uplink reception or the downlink transmission based on at least one CORESET included in each of the first CORESET pool and the second CORESET pool, and the first CORESET pool may be associated with a serving cell, and the second CORESET pool may be associated with one of the serving cell or non-serving cell.

According to an embodiment of the present disclosure, a method and device for performing uplink transmission and reception or downlink transmission and reception in a wireless communication system may be provided.

According to one embodiment of the present disclosure, a method and device for dynamically switching inter-cell (or inter-cell) M-TRP operation or intra-cell (within a cell) M-TRP operation may be provided.

The technical objects to be achieved by the present disclosure are not limited to the above-described technical objects, and other technical objects which are not described herein will be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
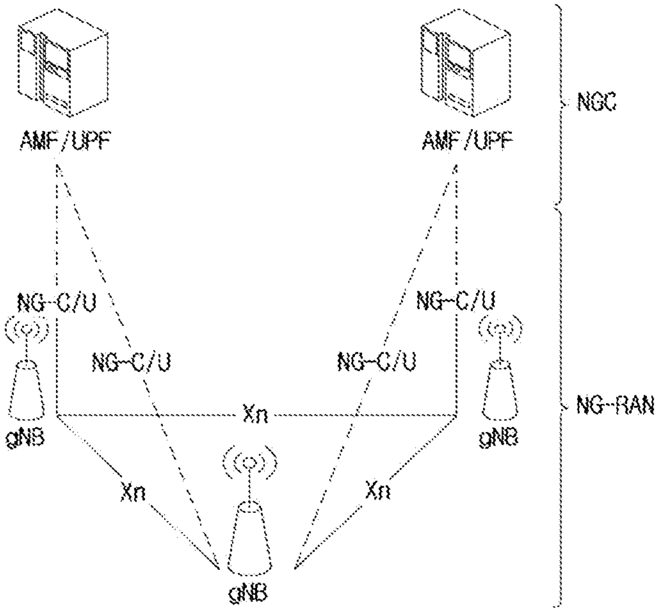
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being “connected”, “combined” or “linked” to another element, it may include an indirect connection relation that yet another element presents therebetween as well as a direct connection relation. In addition, in the present disclosure, a term, “include” or “have”, specifies the presence of a mentioned feature, step, operation, component and/or element, but it does not exclude the presence or addition of one or more other features, stages, operations, components, elements and/or their groups.

In the present disclosure, a term such as “first”, “second”, etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, “and/or”, may refer to one of related enumerated items or it means that it refers to and includes any and all possible combinations of two or more of them. In addition, “/” between words in the present disclosure has the same meaning as “and/or”, unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from abase station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. Abase station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. “xxx” means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
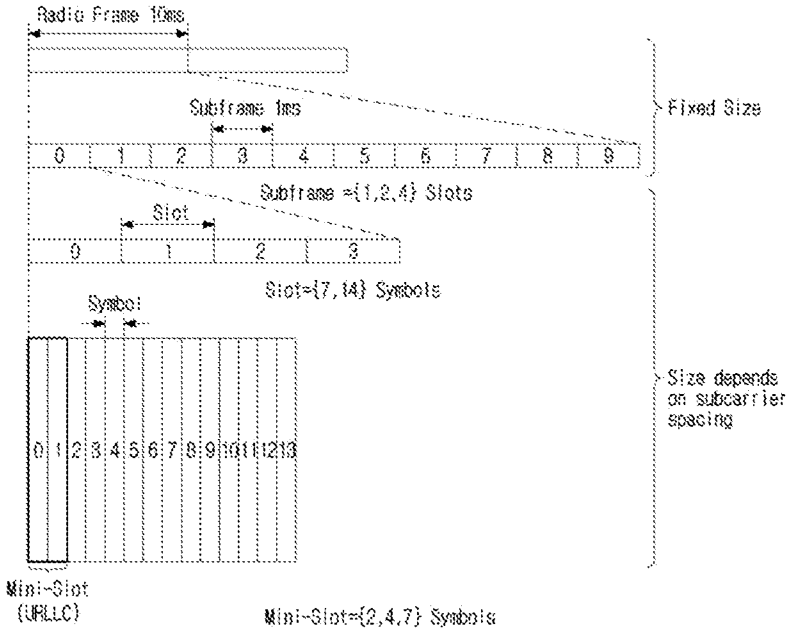
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
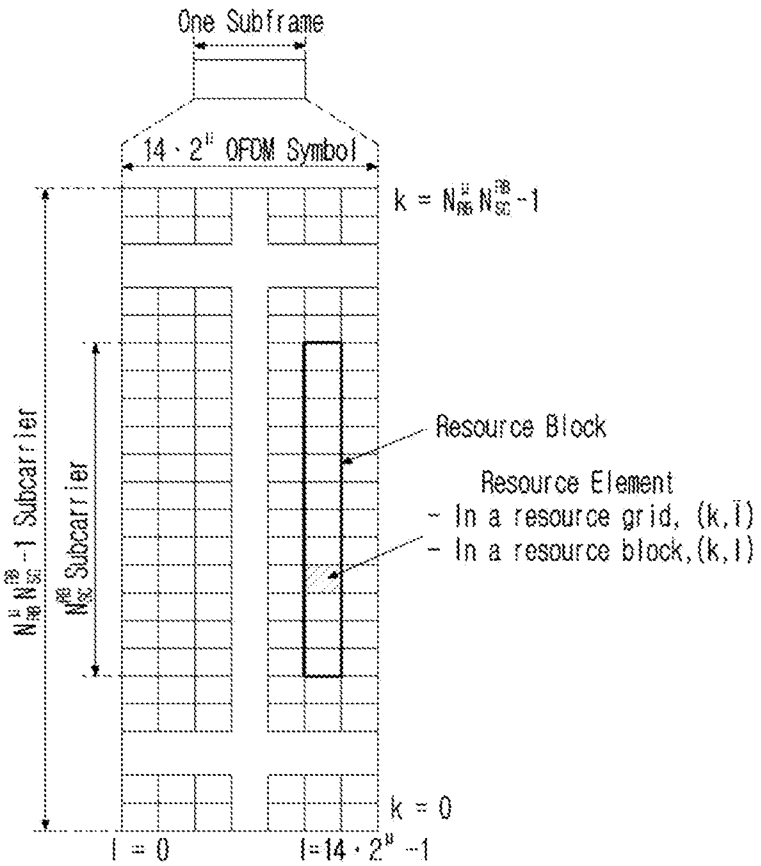
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\leq N_{RB}^{max,\mu}$. The $N_{RB}^{max,\mu}$ represents a maximum transmission bandwidth, which may be different between an uplink and a downlink as well as between numerologies.

In this case, one resource grid may be configured per p and antenna port p. Each element of a resource grid for p and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}-1$. A resource element (k,l') for p and an antenna port p corresponds to a complex value, $a_{k,l'}^{(p,\mu)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows. offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^{\mu}$ and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
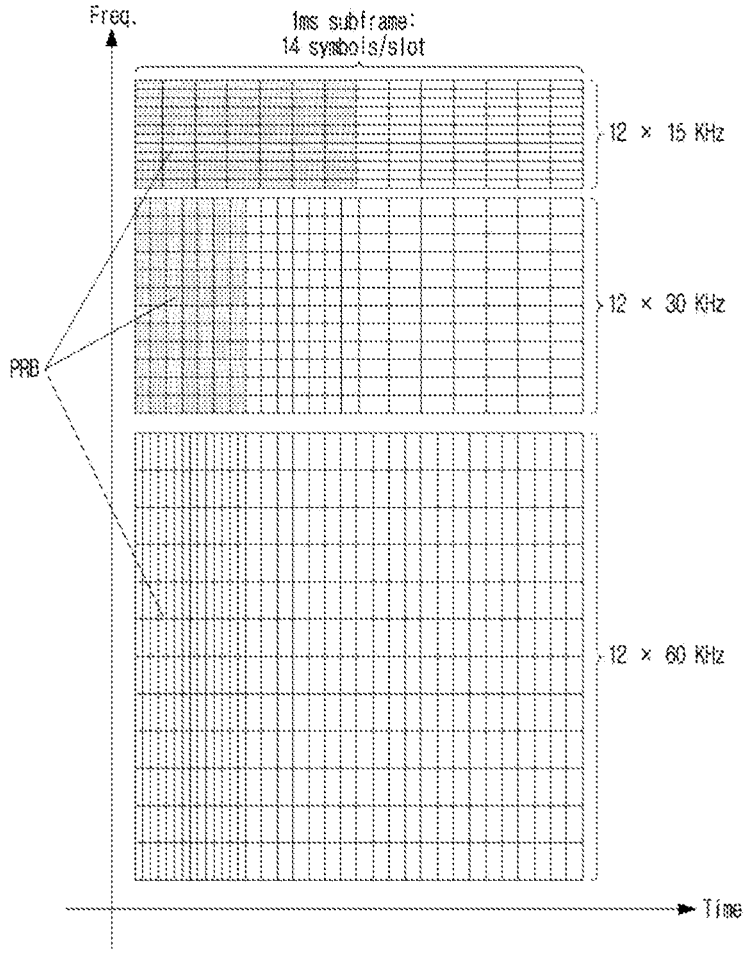
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
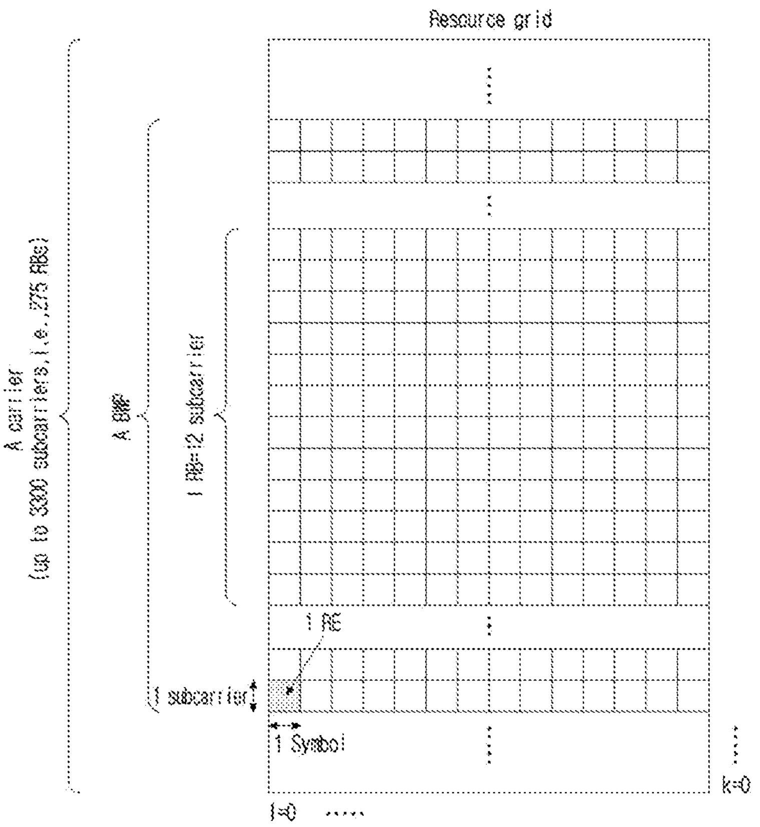
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.).

In addition, abase station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
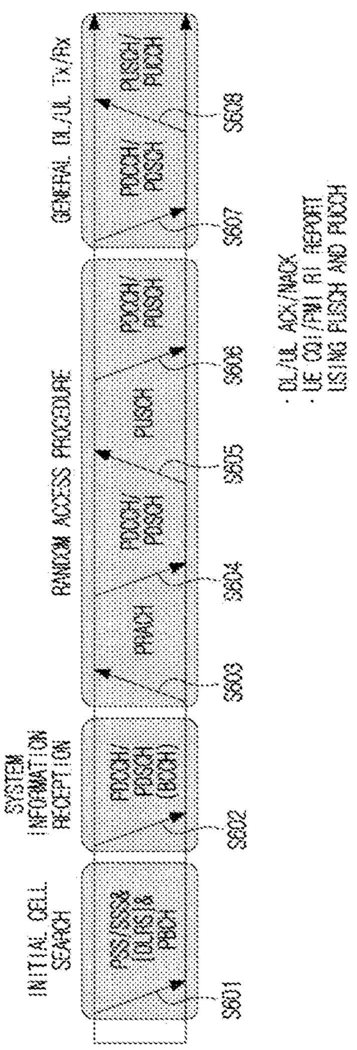
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
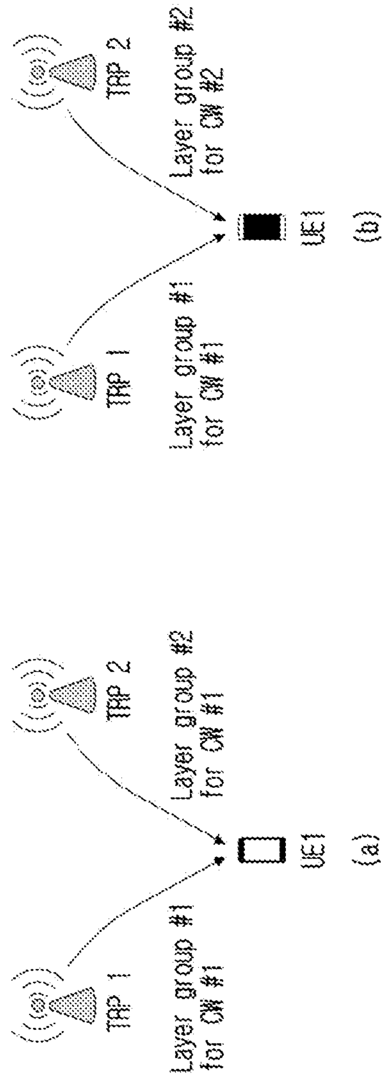
FIG. 7 illustrates a multiple TRP transmission scheme in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to the method illustrated in FIGS. 7 (*a*) and 7 (*b*) above, as the same TB is repeatedly transmitted through different layer groups and each layer group is transmitted by different TRP/panel, the data reception probability of the UE may be increased. This is referred to as a Spatial Division Multiplexing (SDM)-based M-TRP URLLC transmission scheme. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a.

- The same TB is transmitted in one layer or layer set at each transmission time (occasion) and each layer or each layer set is associated with one TCI and one set of DMRS port(s).
- A single codeword having one RV is used in all spatial layers or all layer sets. With regard to UE, different coded bits are mapped to a different layer or layer set by using the same mapping rule 1-b) Method 1b

- The same TB is transmitted in one layer or layer set at each transmission time (occasion) and each layer or each layer set is associated with one TCI and one set of DMRS port(s).
- A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot

- Each non-overlapping frequency resource allocation is associated with one TCI state.

The same single/multiple DMRS port(s) are associated with all non-overlapping frequency resource allocation.

2-a) Method 2a

- A single codeword having one RV is used for all resource allocation. With regard to UE, common RB matching (mapping of a codeword to a layer) is applied to all resource allocation.

2-b) Method 2b

- A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot

- Each transmission time (occasion) of a TB has time granularity of a mini-slot and has one TCI and one RV.
- A common MCS is used with a single or multiple DMRS port(s) at all transmission time (occasion) in a slot.
- A RV/TCI may be the same or different at a different transmission time (occasion).

4) Method 4 (TDM): n (n<=Nt2) TCI States in K (n<=K) Different Slots

- Each transmission time (occasion) of a TB has one TCI and one RV.
- All transmission time (occasion) across K slots uses a common MCS with a single or multiple DMRS port(s).
- A RV/TCI may be the same or different at a different transmission time (occasion).

Downlink Multiple TRP (M-TRP) URLLC Transmission Operation

M-TRP transmission method in which M TRPs transmit data to one terminal may be broadly divided into two types: eMBB M-TRP transmission method, which is a method to increase transmission rate, and URLLC M-TRP transmission method, which is a method to increase reception success rate and reduce latency.

Also from a DCI transport perspective: the M-TRP transmission method can be divided into i) an M-DCI(multiple DCI)-based M-TRP transmission method in which each TRP transmits a different DCI, and ii) an S-DCI(single DCI)-based M-TRP transmission method in which one TRP transmits a DCI. For example, in the case of S-DCI, all scheduling information about data transmitted by M-TRP must be transmitted through one DCI, so it can be used in an ideal BH (ideal BackHaul) environment where dynamic cooperation between two TRPs is possible.

In TDM-based URLLC, scheme 3/4 may be applied. Here, scheme 4 refers to a method in which one TRP transmits TB in one slot, and thus the probability of data reception can be increased through the same TB received in multiple slots from multiple TRPs.

In contrast, Scheme 3 refers to a method in which one TRP transmits TB through at least one consecutive OFDM symbol (i.e., symbol group). Accordingly, within one slot, multiple TRPs may be configured to transmit the same TB through different symbol groups.

Additionally, the UE may recognize the PUSCH (or PUCCH) scheduled by DCI received through different CORESETs (or CORESET belonging to different CORESET groups) as a PUSCH (or PUCCH) transmitted to different TRPs or as a PUSCH (or PUCCH) for different TRPs.

In addition, the method for UL transmission (e.g., PUSCH/PUCCH) transmitted through different TRPs may be equally applied to UL transmission (e.g., PUSCH/PUCCH) transmitted through different panels belonging to the same TRP.

NCJT(Non-Coherent Joint Transmission) Method

The NCJT method refers to a method in which multiple TPs (transmission points) transmit data to one UE using the same time and frequency, and data may be transmitted to different layers using different DMRS ports between TPs. TP may transmit data scheduling information to the UE receiving NCJT through DCI.

At this time, the method in which each TP participating in NCJT transmits scheduling information about the data it transmits to DCI may be referred to as multi-DCI-based NCJT. Since each of N TPs participating in NCJT transmission transmits DL grant DCI and PDSCH to the UE, the UE can receive N DCI and N PDSCH from N TPs.

Differently, a method in which one representative TP transmits scheduling information about the data it transmits and the data transmitted by other TPs through one DCI may be referred to as a single DCI-based NCJT. At this time, N TPs may transmit one PDSCH. At this time, each TP may transmit only some of the multiple layers that make up one PDSCH. For example, when 4-layer data is transmitted, TP 1 transmits layer 2, and TP 2 transmits the remaining 2 layers to the UE.

Hereinafter, the multi-DCI-based NCJT method and the single DCI-based NCJT method will be described in detail.

First, in the case of a single DCI-based M-TRP method, M-TRPs may cooperatively transmit one common PDSCH together, and each TRP participating in cooperative transmission may transmit the corresponding PDSCH by spatially dividing it into different layers (i.e., different DMRS ports). At this time, scheduling information for the PDSCH is indicated to the UE through one DCI, and the QCL RS and QCL type information used for each DMRS port may be indicated in the DCI.

At this time, the above-described method is different from the method of indicating the QCL RS and type to be commonly applied to all DMRS ports through DCI. That is, M TCI states are indicated through the TCI field in the DCI (in case of 2 TRP cooperative transmission, M=2), and the QCL RS and type may be identified for each M DMRS port group using the different M TCI states. Additionally, DMRS port information may be indicated using a new DMRS table.

In addition, in the case of the multi-DCI-based M-TRP method, each M-TRP may transmit a different DCI and PDSCH, and the corresponding PDSCHs may be transmitted (partially or entirely) overlapping each other on frequency/time resources. The corresponding PDSCHs are scrambled through different scrambling IDs, and the corresponding DCIs may be transmitted through CORESETs belonging to different CORESET groups.

Here, the CORESET group may identify the index defined within the CORESET configuration information corresponding to each CORESET. For example, the index is configured to 0 in the CORESET configuration information corresponding to CORESET 1 and 2, and if the index is configured to 1 in the CORESET configuration information corresponding to CORESET 3 and 4, CORESET 1 and 2 may belong to CORESET group 0, and CORESET 3 and 4 may belong to CORESET group 1.

Additionally, if the index is not defined on the configuration information corresponding to the CORESET, the index corresponding to the CORESET may be interpreted as 0. If multiple scrambling IDs are configured in one serving cell or two or more CORESET groups are configured, the UE may be determined to be receiving data using the multi-DCI-based M-TRP method.

For example, whether a single DCI-based M-TRP method or a multi-DCI-based M-TRP method may be indicated to the UE through separate signaling. For example, when multiple CRS patterns are indicated to the UE for M-TRP operation for one serving cell, depending on whether it is a single DCI-based M-TRP method or a multi-DCI-based M-TRP method, PDSCH rate matching for CRS (cell-specific reference signal) may vary. Here, a tracking reference signal (TRS) may be used as a function of CRS, and the UE may use TRS to estimate timing offset, delay spread, frequency offset, and Doppler spread.

The CORESET group ID described/mentioned in the present disclosure may mean an index/identification information (e.g., ID) for distinguishing the CORESET for each TRP/panel. And the CORESET group may be a group/union of CORESETs distinguished by an index/identification information (e.g., ID)/the CORESET group ID, etc. to distinguish the CORESETs for each TRP/panel.

For example, CORESET group ID may be specific index information defined within CORSET setting information. For example, a CORESET group may be configured/indicated/defined by an index defined within the CORESET configuration information for each CORESET.

Additionally or alternatively, CORESET group ID may mean an index/identification information/indicator, etc. for distinction/identification between CORESETs configured/related to each TRP/panel. The CORESET group ID described/mentioned in the present disclosure may be replaced with a specific index/specific identification information/specific indicator for distinction/identification between CORESETs configured/related to each TRP/panel.

The CORESET group ID, that is, a specific index/specific identification information/specific indicator for distinction/identification between CORESETs configured/related to each TRP/panel may be configured/indicated through higher layer signaling (e.g., RRC signaling)/L2 signaling (e.g., MAC-CE)/L1 signaling (e.g., DCI), etc.

For example, PDCCH detection for each TRP/panel may be configured/indicated to be performed on a per-CORESET group basis.

Additionally or alternatively, uplink control information (e.g., CSI, HARQ-A/N, SR) and/or uplink physical channel resources (e.g., PUCCH/PRACH/SRS resources) may be configured/indicated to be managed/controlled separately for each TRP/panel in the CORESET group unit.

Additionally or alternatively, HARQ A/N (process/retransmission) for PDSCH/PUSCH, etc. scheduled for each TRP/panel on a per CORESET group basis may be managed.

For example, the higher layer parameter 'ControlResourceSet IE (information element)' may be used to configure a time/frequency control resource set (CORESET).

For example, the control resource set (CORESET) may be related to detection and reception of downlink control information. The 'ControlResourceSet IE' may include a CORESET-related ID (e.g., 'controlResourceSetID'), an index of the CORESET pool for CORESET (e.g., 'CORESETPoolIndex'), time/frequency resource configurations for CORESET, and/or TCI information related to CORESET.

For example, the index of the CORESET pool (e.g., 'CORESETPoolIndex') may be configured to 0 or 1. In the above description, CORESET group may correspond to CORESET pool, and CORESET group ID may correspond to CORESET pool index (e.g., 'CORESETPoolIndex').

Additionally or alternatively, for each CORESET, the UE may be provided with CORESET index, DM-RS scrambling sequence initialization value by 'pdcch-DMRS-ScramblingID', precoder granularity in terms of number of REGs in the frequency domain, number of consecutive symbols given by 'duration' (i.e. continuous time interval of CORESET), the number of RBs, TCI information, or/and CCE-to-REG mapping parameters, etc., by 'ControlResourceSet IE(information element)'.

Additionally or alternatively, the UE may receive search space-related configuration information from the base station through higher layer signaling (e.g., 'IE SearchSpace').

Here, 'IE SearchSpace' may define the method/location of searching for PDCCH candidates. Each search space may be associated with one 'ControlResourceSet'.

As an example, 'IE SearchSpace' may include a search space ID, CORESET ID applicable to the corresponding search space, the number of consecutive slots that the search space lasts for every occasion, time/frequency information for the search space, period and offset information for the monitoring slots, information on the number of PDCCH candidates, information on the search space group, and/or search space type, etc.

Additionally, NCJT may be divided into fully overlapped NCJT, in which the time-frequency resources transmitted by each TP completely overlap, and partially overlapped NCJT, in which only some time-frequency resources overlap. That is, in the case of partially overlapped NCJT, data from both TP 1 and TP 2 can be transmitted in some time-frequency resources, and only data from either TP 1 or TP 2 may be transmitted in the remaining time-frequency resources.

In the case of the M-TRP NCJT transmission method, two TRPs may transmit different data using different layers/DMRS ports.

For example, DMRS ports belonging to different CDM groups may be grouped. In addition, a DMRS port belonging to the first CDM group may be received using the first QCL beam information (i.e., first TCI state indicated), and a DMRS port belonging to the second CDM group may be received using the second QCL beam information (i.e., indicated second TCI state).

As described above, since the layers/DRMS ports transmitted by the two TRPs are separate and data is not transmitted through a composite channel, there may be no need to align the channel phases of the two TRPs. The above method may be referred to as the (M-TRP) NCJT method, and may also be referred to as the independent layer NCJT method.

Inter-Cell and Intra-Cell M-TRP Switch Method

In a basic wireless communication system, the transmission speed of DL data was increased through the M-DCI-based M-TRP transmission method. However, the M-DCI-based M-TRP transmission method may only be applied between TRPs that exist in an intra cell (i.e., within a cell). In other words, the M-DCI-based M-TRP transmission method may be applied between TRPs existing in two cells with different physical cell IDs (PCI) (i.e., in inter-cell M-TRP).

Since the QCL RS of the DL DMRS (e.g., DMRS on PDSCH or PDCCH) cannot be configured to the SSB of a non-serving (NS) cell rather than the SSB of the serving cell, the M-DCI-based M-TRP transmission method may not be applied between different cells. That is, even if the PDCCH/PDSCH is transmitted in the NS cell, QCL information for receiving the DL DMRS of the corresponding channel cannot be calculated from the SSB of the NS cell, so channel estimation performance may be degraded.

In the improved wireless communication system, the QCL RS of the DL DMRS may be configured to the SSB of the NS cell to solve the above-mentioned problem.

As an example, the serving cell may configure information about the SSB of the NS cell (e.g., period, time domain information, PCI, etc.) to the UE through RRC signaling. Additionally, the serving cell may configure the SSB of the corresponding NS cell to the QCL RS defined in the TCI state, so that the QCL RS of the DL DMRS may be configured to the SSB of the NS cell.

Additionally or alternatively, as described above, in a basic wireless communication system, PDCCH/PDSCH/PUCCH/PUSCH may be transmitted/received independently for each pool using two CORESET pools.

For example, the CORESETs used by TRP 0 are configured to CORESET pool 0, and TRP 0 may perform PDCCH transmission and PDSCH/PUSCH/PUCCH scheduling through CORESET of CORESET pool 0. In addition, the CORESETs used by TRP 1 are set to CORESET pool 1, and TRP 1 may perform PDCCH transmission and PDSCH/PUSCH/PUCCH scheduling through CORESET of CORESET pool 1.

Additionally, overlapping transmission between different PDSCHs/PDCCHs is allowed based on the CORSET pool, so the UE may receive overlapping PDSCHs/PDCCHs from two TRPs.

For inter-cell M-TRP, one PCI associated with at least one of the activated TCI states for PDSCH/PDCCH may be associated with one 'CORESETPoolIndex', and different PCIs associated with at least one of the activated TCI states for PDSCH/PDCCH may be associated with different 'CORESETPoolIndex'. When switching intra-cell M-TRP and inter-cell M-TRP, the association between PCI and 'CORESETPoolIndex' may be used.

That is, for inter-cell M-DCI-based MTRP transmission, CORESET pool and PCI may be mapped 1:1.

In a basic wireless communication system, since the TRP and CORESET pool are configured to correspond 1:1 to each other, in the improved wireless system, the TRP and CORESET pool may similarly correspond to each other 1:1 in inter-cell M-TRP. Accordingly, the PCI and CORESET pools may be configured to correspond 1:1 to each other.

Hereinafter, the CORESET pool configuration and mapping of the CORESET pool and PCI to support switching between inter-cell M-TRP and intra-cell M-TRP are described.

Figure 8:
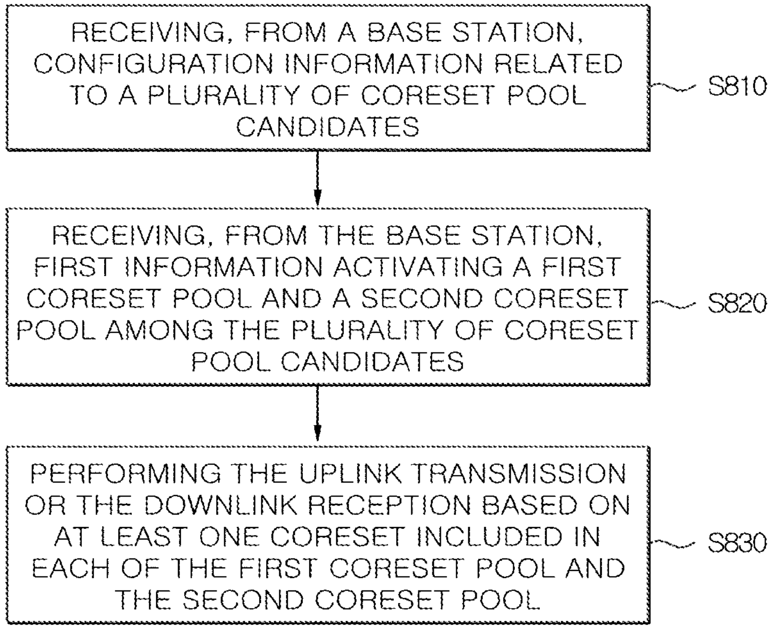
FIG. 8 is a diagram for describing an uplink transmission operation or a downlink reception operation of a terminal in a wireless communication system to which the present disclosure may be applied.

FIG. 8 is a diagram for describing an uplink transmission operation or a downlink reception operation of a terminal in a wireless communication system to which the present disclosure may be applied.

Here, the uplink transmission may include at least one of a physical uplink control channel (PUCCH) or a physical uplink shared channel (PUSCH), and downlink reception may include at least one of a physical downlink control channel (PDCCH) or a physical downlink shared channel (PDSCH).

The UE may receive configuration information related to a plurality of control resource sets (CORESET) pool candidates from the base station (S810).

As an example, the configuration information may include information for configuring for a plurality of the (e.g., four or more) CORESET pool candidates. Here, a plurality of CORESET pool candidates may include the first CORESET pool to the fourth CORESET pool.

Additionally, the configuration information may include information related to at least one CORESET included in each CORESET pool. As an example, information related to at least one CORESET may include the ID of at least one CORESET, TCI status information configured for the CORESET, time/frequency allocation information for the CORESET, etc.

The UE may receive first information activating the first CORESET pool and the second CORESET pool among the candidates for the plurality of CORESET pools from the base station (S820).

Specifically, the UE may receive first information from the base station through MAC CE. However, this is only an example, and the UE may receive the first information from the base station through higher layer signaling or DCI.

Here, the first CORESET pool may be associated with a serving cell, and the second CORESET pool may be associated with either a serving cell or a non-serving cell. That is, the first CORESET pool may correspond to the first PCI of the serving cell, and the second CORESET pool may correspond to either the first physical cell identifier (ID) (PCI) or the second PCI of the non-serving cell (or neighboring cell).

If the second CORESET pool corresponds to the first PCI (i.e., if the second CORESET pool is associated with the serving cell), both the first CORESET pool and the second CORESET pool activated by the first information may be associated with the serving cell. Accordingly, the UE may perform intra-cell M-TRP operation.

As another example, if the second CORESET pool corresponds to a second PCI (i.e., if the second CORESET pool is associated with a non-serving cell), the first CORESET pool and the second CORESET pool activated by the first information may be related to different cells. Accordingly, the UE may perform inter-cell M-TRP operation.

For example, based on the second CORESET pool corresponding to the second PCI, the UE may receive second information activating the first CORESET pool and the third CORESET pool among the plurality of CORESET pool candidates from the base station. Here, the third CORESET pool may correspond to the first PCI.

That is, after the CORESET pool related to a different cell is activated, the UE may receive the MAC CE activated by the CORESET pool related to the same cell from the base station. Accordingly, inter-cell M-TRP operation may be switched to intra-cell M-TRP operation.

As another example, based on the second CORESET pool corresponding to the first PCI, the UE may receive third information from the base station that activates the first CORESET pool and the fourth CORESET pool among the plurality of CORESET pool candidates. At this time, the fourth CORESET pool may correspond to the second PCI.

That is, after the CORESET pools related to the same cell are activated, the UE may receive MAC CE activated by the CORESET pools related to different cells from the base station. Accordingly, intra-cell M-TRP operation may be switched to inter-cell M-TRP operation.

As another example, assume that an inter-cell M-TRP operation is performed (i.e., the second CORESET pool is associated with a non-serving cell). Here, the first PCI of the serving cell associated with at least one activated first transmission configuration indicator (TCI) state may correspond to the first CORESET pool. And, the second PCI of the non-serving cell associated with at least one activated second TCI state may correspond to the second CORESET pool.

Additionally, the at least one activated first TCI state may correspond to a synchronization signal block (SSB) of a serving cell, and the at least one activated second TCI state may correspond to an SSB of a non-serving cell. That is, the SSB of the serving cell may be indicated by at least one activated first TCI state, and the SSB of the non-serving cell may be indicated by at least one activated second TCI state.

The UE may perform uplink transmission or downlink reception based on at least one CORESET included in the first CORESET pool and the second CORESET pool (S830).

As an example, the PDCCH may be received from the base station based on the CORESET included in at least one of the first CORESET pool or the second CORESET pool. And, the UE may transmit PUSCH or receive PDSCH based on the PDCCH. That is, the UE may perform transmission of the PUSCH or reception of the PDSCH scheduled by the DCI included in the PDCCH.

Figure 9:
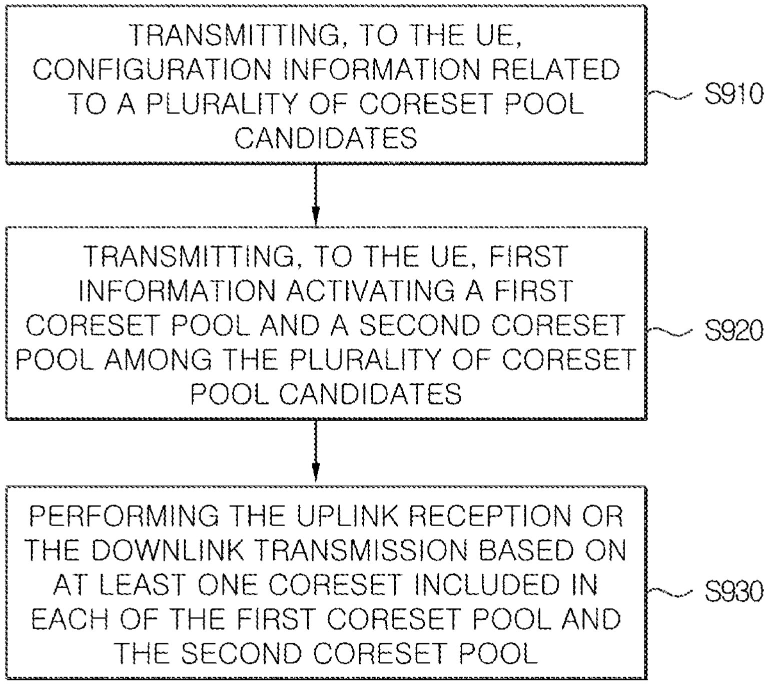
FIG. 9 is a diagram for describing an uplink reception operation or a downlink transmission operation of a base station in a wireless communication system to which the present disclosure may be applied.

FIG. 9 is a diagram for describing an uplink reception operation or a downlink transmission operation of a base station in a wireless communication system to which the present disclosure may be applied.

The base station may transmit configuration information related to the plurality of CORESET pool candidates to the UE (S910). Since the above configuration information has been described with reference to FIG. 8, redundant description will be omitted.

The base station may transmit first information activating the first CORESET pool and the second CORESET pool among the plurality of CORESET pool candidates to the UE (S920).

Here, the first CORESET pool may be associated with a serving cell (or the first PCI of the serving cell), and the second CORESET pool may be associated with either a serving cell (or first PCI) or a non-serving cell (or second PCI of a non-serving cell).

That the second CORESET pool is associated with a serving cell may mean that the base station has configured/indicated intra-cell M-TRP operation. Being associated with a second CORESET pool non-serving cell may mean that the base station has set/instructed inter-cell M-TRP operation.

In other words, the base station may select/configure/indicate an intra-cell M-TRP operation or an inter-cell M-TRP operation by transmitting first information activating a specific CORESET pool among the plurality of CORESET pool candidates to the UE.

The base station may perform uplink reception or downlink transmission based on at least one CORESET included in the first CORESET pool and the second CORESET pool (S930).

The first CORESET pool may correspond to the first TRP, and the second CORESET pool may correspond to the second TRP. The first TRP may transmit a downlink channel (e.g., PDCCH) to the UE based on the first CORESET pool. And, the second TRP may transmit a downlink channel (e.g., PDCCH) to the UE based on the second CORESET pool.

And, the first TRP and the second TRP may transmit the scheduled PDSCH to the UE through the PDCCH. Alternatively, the first TRP and the second TRP may receive the scheduled PUSCH from the UE through the PDCCH.

Hereinafter, CORESET pool configuration and mapping method between CORESET pool and PCI to support switching between inter-cell M-TRP and intra-cell M-TRP will be described.

Embodiment 1

Embodiment 1 relates to a method of supporting switching between inter-cell M-TRP and intra-cell M-TRP by activating a specific CORESET pool among a plurality of CORESET pool candidates.

Specifically, the number of CORESET pool candidates may be expanded to three or more and set for the UE. As an example, assume that CORESET pools A, B, C, and D are configured/defined as CORESET pool candidates.

Here, CORESET pool A may be configured to the CORESET(s) used by TRP 0 of the serving cell, and CORESET pool B may be set to the CORESET(s) used by TRP 1 of the serving cell. In addition, CORESET pool C may be configured to the CORESET(s) used by TRP 0 of the non-serving (NS) cell, and CORESET pool D may be configured to the CORESET(s) used by TRP 1 of the NS cell.

Here, information related to the CORESET(s) and CORESET pool used by each TRP may be configured for the UE by higher layer signaling.

The base station may activate (via MAC CE signaling) only some of the CORESET pool candidates. For example, by activating only two of the CORESET pool candidates, the base station may use two CORESET pools in the same way as M-TRP in a basic wireless communication system.

As an example, assume that CORESET pools A and B are activated by the base station. Here, since both activated CORESET pools A and B correspond to the TRP of the serving cell, intra-cell M-TRP operation may be performed.

As another example, assume that CORESET A and C are activated by the base station. Here, the activated CORESET pool A may correspond to the TRP of the serving cell, and CORESET pool C may correspond to the TRP of the NS, so inter-cell M-TRP operation may be performed.

As described above, the CORESET pool candidates may be dynamically mapped to CORESET pool 0 and 1 through activation according to MAC CE. Accordingly, dynamic switching between the inter-cell M-TRP method and the intra-cell M-TRP method may be possible.

Embodiment 2

Embodiment 2 relates to a method of performing dynamic switching between the inter-cell M-TRP method and the intra-cell M-TRP method by activating some/all of the CORESETs set in the CORESET pool through MAC CE.

Specifically, when two CORESET pools are configured, the base station may activate some/all of the CORESETs included in the two CORESET pools through MAC CE. The UE may determine that only activated CORESETs are valid and may ignore deactivated/released CORESET(s).

For example, in CORESET pool 0, CORESET (e.g., CORESET 0) used by TRP 0 of the serving cell and CORESET (e.g., CORESET 1) used by TRP of NS may be set through RRC signaling. And, in CORESET pool 1, CORESET (e.g., CORESET 2) used by TRP 1 of the serving cell and CORESET (e.g., CORESET 3) used by TRP 1 of NS may be configured through RRC signaling.

Afterwards, the base station may perform an inter-cell M-TRP operation or an intra-cell M-TRP operation by activating the CORESET actually used in the CORESET pool through MAC CE.

For example, if CORESET 0 and 2 are activated in CORESET pool 0 and 1, respectively, intra-cell M-TRP operation may be performed. As another example, if CORESET 0 and 2 are activated in CORESET pool 0 and 1, respectively, intra-cell M-TRP operation may be performed. As another example, when CORESET 0 and 3 are activated in CORESET pool 0 and 1, respectively, inter-cell M-TRP operation may be performed.

In the above-described embodiment, the UE may not expect CORESETs associated with different TRPs/cells within a specific CORESET pool to be activated simultaneously. Accordingly, it may be guaranteed that all CORESETs in the same CORESET pool are transmitted from the same TRP/cell.

When dynamic coordination is not possible in different TRPs/cells, if CORESETs from the same CORESET pool are transmitted from different TRPs/cells, each TRP may individually perform PDCCH/PDSCH/PUSCH/PUCCH scheduling without dynamic adjustment. Accordingly, the scheduling of each TRP cannot be performed correctly as it becomes entangled with each other.

Embodiment 3

As in a basic wireless communication system, two CORESET pools are configured, but the CORESET settings and connected SS sets may be changed depending on whether the cells/PCIs associated with the CORESETs configured for the two CORESET pools are the same.

Whether the PCI associated with CORESET is the same may be determined depending on whether the QCL RS or QCL top source in the TCI state activated in CORESET is the SSB of the same cell (/PCI).

For example, if the QCL RS or QCL top source in the TCI state activated in CORESET is the SSB of the same cell (/PCI), the PCI associated with CORESET may be defined as the same. As another example, if the QCL RS or QCL top source in the TCI state activated in CORESET is the SSB of a different cell (/PCI), the PCI associated with CORESET may be defined as not being the same.

Here, QCL top source may mean a QCL RS in (another) TCI state connected to the corresponding QCL RS if the QCL RS in TCI state connected to CORESET is a DL RS (e.g., CSI-RS or TRS) other than SSB. In other words, when tracking the QCL RS set/connected to the TCI state configured for CORESET, it means the QCL RS that was finally set/connected.

For example, if the QCL-RS of the DMRS is configured to CSI-RS, the QCL RS of the CSI-RS is configured to TRS, and the QCL RS of the TRS is set to SSB, the QCL top source of the DMRS may be the SSB.

As an example, assume that CORESET 0 and 1 are configured in CORESET pool 0 and CORESET 2 and 3 are configured in CORESET pool 1. If CORESET 0, 1, 2, and 3 are all associated with the PCI of the same cell (e.g., PCI=1), detailed parameter set 1, SS set mapping 1, and C-RNTI 1 configured in CORESET IE may be used. And, if CORESET 0, 1, 2, and 3 are all associated with (another) same cell's PCI (e.g., PCI=2), detailed parameter set 2, SS set mapping 2, and C-RNTI 2 configured in CORESET IE may be used.

As another example, assume that CORESET 0 and 1 belonging to CORESET pool 0 are associated with 'PCI=1', but CORESET 2 and 3 belonging to CORESET pool 1 are associated with 'PCI=2'. Here, CORESET 0 and 1 may use detailed parameter set 1, SS set mapping 1, and C-RNTI 1 configured in CORESET IE and CORESET 2 and 3 may use detailed parameter set 2, SS set mapping 2, and C-RNTI 2 configured in CORESET IE.

To this end, the first configuration information (e.g., detailed parameter set 1, SS set mapping 1, C-RNTI 1) and the second configuration information (e.g., detailed parameter set 2, SS set mapping 2, C-RNTI 2) may be configured for the UE in advance through RRC signaling. The UE may automatically determine one of the two configuration information configured above by comparing whether the PCI of CORESET pool 0 and the PCI of CORESET pool 1 are the same.

The UE may not expect CORESETs associated with different TRPs/cells to be activated simultaneously within the same CORESET pool.

That is, the activated TCI state of CORESET constituting the same CORESET pool may be configured to the same cell/PCI SSB as the QCL RS or QCL top source. As a result, it may be guaranteed that all CORESETs in the same CORESET pool are transmitted from the same TRP/cell.

For example, when dynamic coordination is not possible in different TRPs/cells, when CORESETs from the same CORESET pool are transmitted from different TRPs/cells, each TRP may individually perform PDCCH/PDSCH/PUSCH/PUCCH scheduling without dynamic adjustment. Accordingly, the scheduling of each TRP cannot be performed correctly as it becomes entangled with each other.

Figure 10:
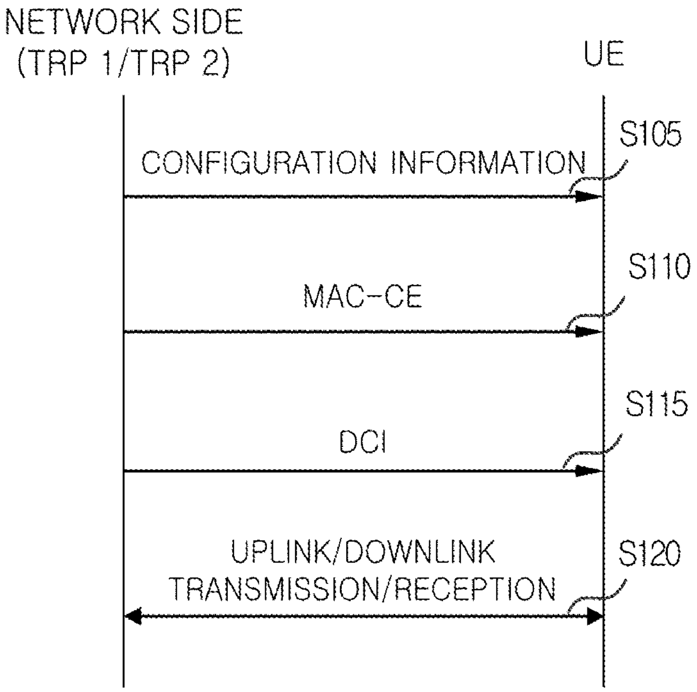
FIG. 10 is a diagram for describing the signaling procedure of the network side and the terminal according to an embodiment of the present disclosure.

FIG. 10 is a diagram for describing the signaling procedure of the network side and the UE according to an embodiment of the present disclosure.

FIG. 10 shows an example of signaling between a network side and a terminal (UE) in an M-TRP situation to which the Embodiments (e.g., Embodiment 1, Embodiment 2, Embodiment 3, or a combination of one or more of their specific Embodiments) of the present disclosure described above may be applied.

Here, the UE/network side is an example and may be replaced with various devices as described with reference to FIG. 11. FIG. 10 is for convenience of explanation and does not limit the scope of the present disclosure. Additionally, some step(s) shown in FIG. 10 may be omitted depending on the situation and/or settings. Additionally, in the operation of the network side/UE in FIG. 10, the above-described uplink transmission and reception operation, M-TRP-related operation, etc. may be referenced or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station(gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one terminal. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP(Transmission Point), at least one TRP(Transmission and Reception Point), etc. In addition, a TP and/or a TRP may include a panel, a transmission and reception unit, etc. of a base station.

The UE may receive configuration information from the network side through/using TRP1 and/or TRP2 (S105).

The configuration information may include information related to CORESET in which a plurality of TCI states are configured. The configuration information may include information related to network-side configuration (i.e., TRP configuration), resource allocation information related to transmission and reception based on M-TRP, and the like. The configuration information may be transmitted through higher layers (e.g., RRC, MAC CE). In addition, when the configuration information is defined or configured in advance, the corresponding step may be omitted.

As another example, the configuration information may include information related to a CORESET group (or CORESET pool) and/or information related to at least one CORESET included in the CORESET pool.

As an example, information related to at least one CORESET (e.g., 'ControlResourceSet IE') may include a CORESET-related ID, an index of the CORESET pool (e.g., 'CORESETPoolIndex') including the corresponding CORESET, time/frequency resource settings of the CORESET, and/or TCI information related to the CORESET.

Additionally or alternatively, it may include DM-RS scrambling sequence initialization value, precoder granularity in terms of the number of REGs in frequency domain, the number of consecutive symbols provided by 'duration', the number of RBs, TCI information, or/and CCE-to-REG mapping parameters, etc.

As another example, the configuration information may include configuration information related to a search space (SS) (e.g., 'IE SearchSpace'). Here, 'IE SearchSpace' may define the method/location of searching for PDCCH candidates. Each search space may be associated with one 'ControlResourceSet'.

As an example, 'IE SearchSpace' may include search space ID, CORESET ID that can be applied to that search space, the number of consecutive slots that the search space lasts for on all occasions, time/frequency information on the search space, period and offset information about the monitoring slot, information about the number of PDCCH candidates, information about the search space group, and/or search space type, etc.

For example, the operation of the UE (100 or 200 in FIG. 11) in step S105 described above receiving the configuration information from the network side (200 or 100 in FIG. 11) can be implemented by the device in FIG. 11, which will be described below. For example, referring to FIG. 11, one or more processors 102 may control one or more transceivers 106 and/or one or more memories 104 to receive the configuration information, and one or more transceivers 106 may receive the configuration information from a network side.

The UE may receive MAC CE from the network side through/using TRP1 and/or TRP2 (S110).

As an example, the UE may receive a MAC CE from the network that activates at least one CORESET pool among a plurality of CORESET pools. For example, when four CORESET pool candidates are configured, the UE may receive a MAC CE from the network that activates two of the four CORESET pool candidates.

As another example, the UE may receive a MAC CE from the network that activates at least one of at least one CORESET included in a plurality of CORESET pools. For example, when two CORESET pools are configured, the UE may activate at least one specific CORESET among at least one CORESET included in each CORESET pool.

As the CORESET pool/CORESET activated by the MAC CE transmitted from the network side changes, inter-cell M-TRP operation and intra-cell MTRP operation may be switched.

For example, the operation of the UE (100 or 200 in FIG. 11) in step S115 described above to receive the MAC CE from the network side (200 or 100 in FIG. 11) can be implemented by the device in FIG. 11, which will be described below. For example, referring to FIG. 11, one or more processors 102 may control one or more transceivers 106 and/or one or more memories 104 to receive the MAC CE, and one or more transceivers 106 may receive the MAC CE from a network side.

The UE may receive DCI from the network side through/using TRP1 and/or TRP2 (S115).

For example, the UE may receive a DCI scheduling uplink/downlink from the network side. Additionally, if the control information is defined or configured in advance, the corresponding step may be omitted.

Here, DCI may be transmitted to the UE through at least one CORESET included in the CORESET pool activated by MAC CE. As another example, DCI may be transmitted to the UE through at least one CORESET activated by MAC CE.

For example, the operation of the UE (100 or 200 in FIG. 11) in step S115 described above receiving the control information from the network side (200 or 100 in FIG. 11) can be implemented by the device in FIG. 11, which will be described below. For example, referring to FIG. 11, one or more processors 102 may control one or more transceivers 106 and/or one or more memories 104 to receive the control information, and one or more transceivers 106 may receive the control information from a network side.

The UE may transmit uplink or receive downlink to the network (S120).

Here, the uplink transmission and downlink reception may be scheduled by DCI. The UE may repeatedly perform uplink transmission and downlink reception according to the above-described method (e.g., M-TPR NCJT method).

For example, the operation of the UE (100 or 200 in FIG. 11) in step S120 described above transmitting uplink to the network side (200 or 100 in FIG. 11) or receiving downlink from the network side (200 or 100 in FIG. 11) can be implemented by the device of FIG. 11, which will be described below.

Figure 11:
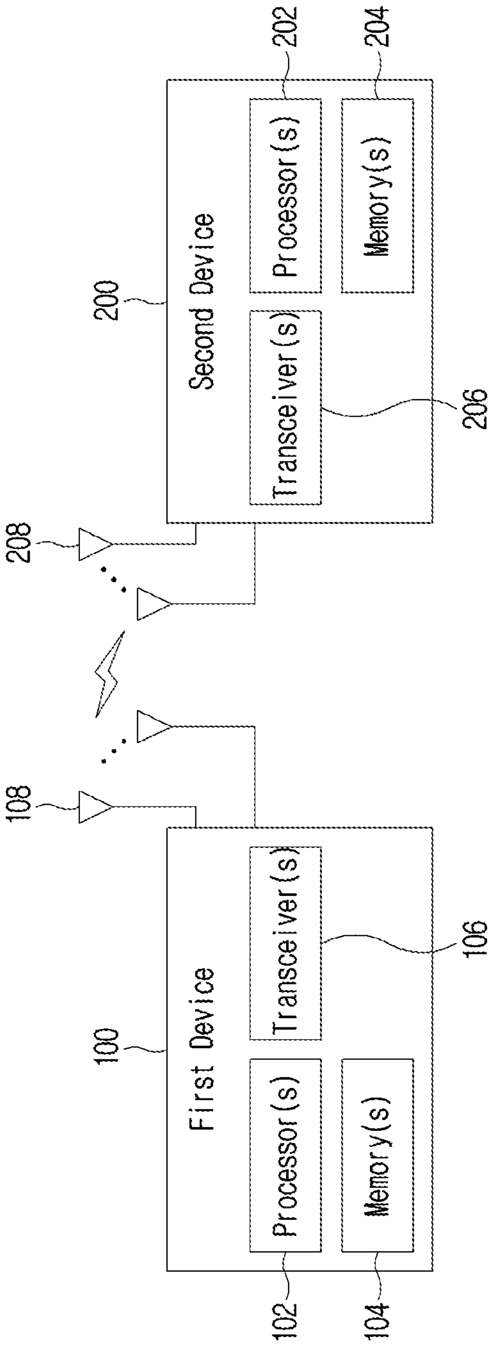
FIG. 11 illustrates a block diagram of a wireless communication device according to an embodiment of the present disclosure.

For example, referring to FIG. 11, one or more processors 102 may control one or more transceivers 106 and/or one or more memories 104, etc. to transmit uplink or receive downlink, and one or more transceivers 106 may transmit uplink or receive downlink to the network side.

General Device to which the Present Disclosure May be Applied

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202.

Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving, by a user equipment (UE) from a base station, a radio resource control (RRC) message including information related to a plurality of control resource sets (CORESET) pool candidates;

receiving, by the UE from the base station, a first medium access control (MAC) control element (CE) including information activating a first CORESET pool and a second CORESET pool among the plurality of CORESET pool candidates; and performing, by the UE, uplink transmission or downlink reception based on at least one CORESET included in each of the first CORESET pool and the second CORESET pool, wherein, based on the first CORESET pool being related to a first physical cell identifier (PCI) of a serving cell, and the second CORESET pool being related to a second PCI of a non-serving cell:

a second MAC CE including information activating the first CORESET pool and a third CORESET pool among the plurality of CORESET pool candidates is received from the base station; and the third CORESET pool is related to the first PCI.

2. The method of claim 1, wherein:

the first PCI of the serving cell associated with at least one activated first transmission configuration indicator (TCI) state corresponds to the first CORESET pool, and the second PCI of the non-serving cell associated with at least one activated second TCI state corresponds to the second CORESET pool.

3. The method of claim 2, wherein:

the at least one activated first TCI state corresponds to a synchronization signal block (SSB) of the serving cell, and the at least one activated second TCI state corresponds to a SSB of the non-serving cell.

4. The method of claim 1, wherein:

the uplink transmission includes at least one of a physical uplink control channel (PUCCH) or a physical uplink shared channel (PUSCH), and the downlink reception includes at least one of a physical downlink control channel (PDCCH) or a physical downlink shared channel (PDSCH).

5. The method of claim 4, wherein:

the PDCCH is received from the base station based on a CORESET included in at least one of the first CORESET pool or the second CORESET pool, and transmission of the PUSCH or reception of the PDSCH is performed based on the PDCCH.

6. A user equipment (UE) comprising:

at least one transceiver; and at least one processor connected to the at least one transceiver, wherein the at least one processor is configured to:

receive, from a base station through the at least one transceiver, a radio resource control (RRC) message including information related to a plurality of control resource sets (CORESET) pool candidates;

receive, from the base station through the at least one transceiver, first-a first medium access control (MAC) control element (CE) including information activating a first CORESET pool and a second CORESET pool among the plurality of CORESET pool candidates; and perform uplink transmission or downlink reception based on at least one CORESET included in each of the first CORESET pool and the second CORESET pool, wherein, based on the first CORESET pool being related to a first physical cell identifier (PCI) of a serving cell, and the second CORESET pool being related to a second PCI of a non-serving cell:

a second MAC CE including information activating the first CORESET pool and a third CORESET pool among the plurality of CORESET pool candidates is received from the base station; and the third CORESET pool is related to the first PCI.

7. A base station comprising:

at least one transceiver; and at least one processor connected to the at least one transceiver, wherein the at least one processor is configured to:

transmit, to a user equipment (UE) through the at least one transceiver, a radio resource control (RRC) message including information related to a plurality of control resource sets (CORESET) pool candidates;

transmit, to the UE through the at least one transceiver, a first medium access control (MAC) control element (CE) including information activating a first CORESET pool and a second CORESET pool among the plurality of CORESET pool candidates; and perform uplink reception or downlink transmission based on at least one CORESET included in each of the first CORESET pool and the second CORESET pool, wherein, based on the first CORESET pool being related to a first physical cell identifier (PCI) of a serving cell, and the second CORESET pool being related to a second PCI of a non-serving cell:

a second MAC CE including information activating the first CORESET pool and a third CORESET pool among the plurality of CORESET pool candidates is transmitted to the UE; and the third CORESET pool is related to the first PCI.

* * * * *